United States Patent [19]

Montague

[11] 4,156,838

[45] May 29, 1979

[54] ACTIVE FILTER CIRCUIT FOR TRANSIENT SUPPRESSION

[75] Inventor: Herbert R. Montague, Binghamton, N.Y.

[73] Assignee: Control Concepts Corporation, Binghamton, N.Y.

[21] Appl. No.: 914,558

[22] Filed: Jun. 12, 1978

[51] Int. Cl.$^2$ .......................... G05F 3/00; H02H 1/04
[52] U.S. Cl. ........................................ 323/8; 307/318; 323/22 Z; 328/215; 361/110; 361/118
[58] Field of Search .................... 323/8, 22 Z, 76, 79, 323/81; 361/10, 16, 17, 18, 56, 58, 110, 117, 118; 307/318, 237; 328/215

[56] References Cited

U.S. PATENT DOCUMENTS

| | | | |
|---|---|---|---|
| 3,423,635 | 1/1969 | Moe | 361/117 |
| 3,793,535 | 2/1974 | Chowdhuri | 361/118 |
| 3,934,175 | 1/1976 | Clark | 361/118 |
| 4,023,071 | 5/1977 | Fussell | 361/118 |
| 4,095,163 | 6/1978 | Montague | 323/8 |

*Primary Examiner*—Gerald Goldberg

[57] ABSTRACT

Suppression circuit for transient noise pulses in which the magnitude of the pulse is limited to the threshold value of a selected breakdown device that is equally effective with voltage excursions of either polarity, and which includes means to reduce the high frequency content of the noise pulse and radically attenuate any tendency for oscillation.

8 Claims, 4 Drawing Figures

ACTIVE FILTER CIRCUIT FOR TRANSIENT SUPPRESSION

RELATED APPLICATION

Portions of the material herein disclosed have been disclosed and claimed in a co-pending application for patent, Ser. No. 692,013, filed June 1, 1976, by H. R. Montague entitled "TRANSIENT VOLTAGE SUPPRESSION CIRCUIT," now U.S. Pat. No. 4,095,163.

BACKGROUND OF THE INVENTION

This invention relates generally to circuits for suppressing transient noise pulses, and, more particularly, to such circuits that actually filter the supply by shorting out these pulses across the supply and decreasing the high frequency content of the noise pulse.

The presence of transient noise pulses or spikes resulting from lightning, line faults, or power switching can produce circuit-damaging overvoltages or erroneous, extraneous signals due to their high frequency content. Suppression circuits are known which are capable of substantially attenuating these transients, but these circuits are unable to entirely eliminate the disruptions.

Although a transient spike is attenuated, there remains a sharp or fast rise time and high frequency content that can produce one or more oscillations. In the low voltage, high frequency digital circuits in common use, the fluctuations can be falsely detected as data or control signals.

OBJECTS AND SUMMARY OF THE INVENTION

It is accordingly a primary object of this invention to provide an inexpensive suppression circuit that not only is capable of attenuating transient voltage pulses but is also able to slow the rise time of the attenuated pulse and eliminate the high harmonic frequencies contained within the pulses.

Another important object of this invention is to provide a suppression circuit for transient noise pulses in which an inductor and capacitor are used in conjunction with a selectively operable noise attenuation circuit to sufficiently slow the rise time of transients to remove remaining harmful high frequency components.

A still further object of this invention is to provide a suppression circuit for transient noise pulses that is equally effective with either polarity, and serves as a temporary restorative energy source for noise pulses opposite to the supply polarity.

The foregoing objects are attained in accordance with the invention by providing an inductor in series with the load and a low impedance path for the high frequency noise pulses across a varying supply. The low impedance path comprises a first capacitor, breakdown device, and resistor in parallel with each other from one side of the supply to a junction with a second capacitor that is connected to the other side of the supply. Potential at the junction between the parallel components and second capacitor is normally maintained by the resistor at a reference voltage that follows the changing supply voltage within the threshold value of the breakdown device, so that the latter is normally minimally conducting. The first capacitor has a fraction of the capacitance of the second that is usually 5% to 25%. Each capacitor presents a high impedance to the normal supply voltage at its frequency, but a low impedance to the high frequency transient pulses.

The first or smaller capacitor is able to absorb some of the high frequency components of the transient. However, as soon as the pulse magnitude exceeds the threshold value of the breakdown device, significantly greater conduction occurs through the second capacitor which serves as a low impedance path across the supply. This suppression circuit is insensitive to polarity and is equally effective against positive or negative-going excursions in limiting the magnitude of the transient to the threshold value of the breakdown device. Greater pulse attenuation and damping are achieved by removing high frequency components initially with the smaller capacitor. This is combination with the breakdown device and dissipative element substantially reduce the oscillation or ringing found in former circuits.

The foregoing and other objects, features and advantages will become apparent from the following, more detailed description of referred embodiments of the invention given by way of example with reference to the accompanying drawing.

DESCRIPTION OF THE PREFERRED EMBODIMENTS

Figure 1:
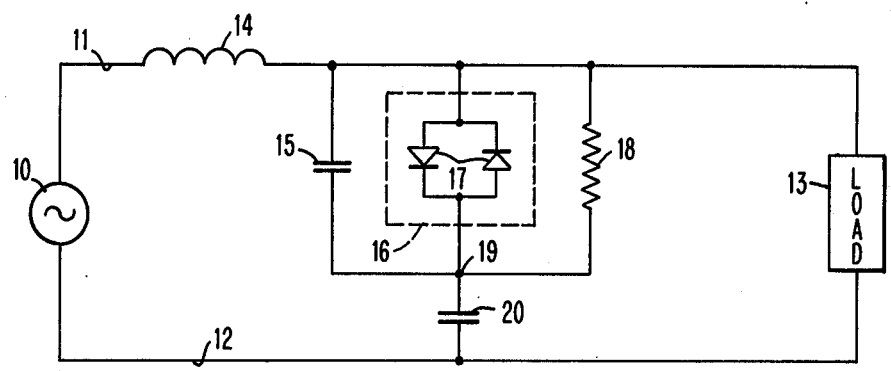
FIG. 1 is a schematic diagram of a transient suppression circuit constructed in accordance with the principles of the invention.

Referring to FIG. 1, a source 10 of cyclically varying potential, such as an A.C., 60 Hz. generator, is connected through lines 11 and 12 to load 13. An inductor 14 is connected in series with the load in one of the supply lines 11 or 12. Connected across the source on the load side of the inductor is an active filter circuit comprised of capacitor 15, breakdown device 16 including diodes 17, and resistor 18. These are all connected in parallel from line 11 to a junction 19 which is, in turn, connected through another capacitor 20 to line 12 at the opposite side of the supply.

Figure 2:
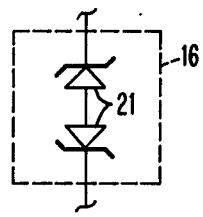
FIG. 2 is a diagram of an alternate breakdown device that can be used in the circuit of FIG. 1.

Breakdown device 16 is any semiconductor device having a predetermined, predictable threshold conduction level for either polarity. Examples of such devices are oppositely poled parallel silicon rectifiers 17, as shown, or back-to-back Zener diodes 21 shown in FIG. 2. These devices have characteristic voltages at which conduction occurs, and can be connected in different arrangements or numbers to establish the desired threshold value. Capacitors 15 and 20 are each selected to present a relatively high impedance path between supply lines 11 and 12 at the supply frequency, and a relatively low impedance path for noise pulses which have higher frequency components. However, capacitor 15 preferably has from 5% to 25% of the capacitance of capacitor 20, nominally 10%.

Figure 3:
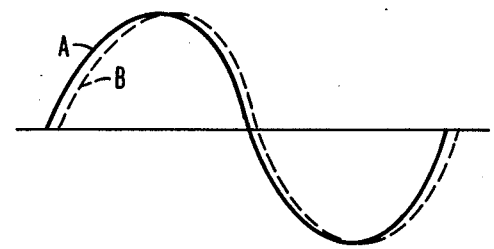
FIG. 3 is a wave form comparing supply and reference potentials as they occur in the circuit of FIG. 1.

In the absence of transient pulses, the source voltage will appear as indicated by solid line A in FIG. 3. The reference voltage at junction 19 will lag the source voltage as indicated by dashed line 13, primarily because of the voltage drop across resistor 18 and breakdown device 16. The voltage difference between line A and B will be limited by the threshold conduction value of device 16. This difference, of course depends upon the values and characteristics of the components used and may be from a fraction of a volt to several volts.

When a transient pulse occurs, its frequency and voltage magnitude far exceed those of the source. Breakdown device 16 attempts to immediately conduct due to the changing noise potential but, before a significant change in conduction can occur, the charge on capacitor 15 is altered having the effect of "slowing down" the rise time or increasing the time required to reach the new threshold conduction level of the breakdown device. This limits the high frequency components of the transient pulse. Although the breakdown elements have fast switching capability, they do not switch to full conduction instantaneously. Thus, capacitor 15 moderates the slope of the transient voltage change, and breakdown device 16 limits the magnitude.

With the occurrence of a subsequent accompanying reversal of polarity, capacitor 15 discharges, removing high frequency components and capacitor 20 discharges as the voltage difference exceeds the threshold level of device 16. The result is that the frequency content of the transient is modified to substantially reduce oscillation and ringing. In addition, the spurious voltage excursions are severely attenuated, being limited to a value approximating the threshold conduction level of the breakdown device in either direction from the instantaneous source value.

Figure 4:
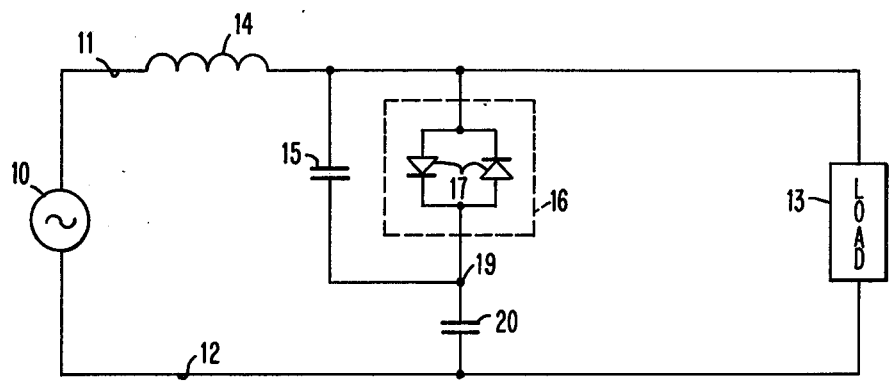
FIG. 4 is a schematic diagram of an alternative embodiment of the circuit in FIG. 1.

FIG. 4 illustrates a modification of the circuit in FIG. 1 by omitting resistor 18. Other components remain the same. Although the resistor assists in the conduction of breakdown device 16 by sharing current load, it can be eliminated with some accompanying deterioration of the noise suppression effectiveness.

Capacitor 15 and resistor 18 are essentially compensating devices for the imperfect switching elements in the threshold device. The switching elements have a threshold value but do not exhibit zero impedance to the rapid rise in voltage of the transient.

In the foregoing discussion, the transient noise pulse has been assumed to have originated at potential source 10. Some load circuits or components, however, may produce the noise pulses and it becomes desirable to attenuate these to prevent their propagation back through the source to other circuits. This "reverse" protection is accomplished with the invention by merely placing the inductor, such as inductor 14, in FIGS. 1 or 4, in one of the supply lines 11 or 12 between load 13 and the active filter circuit comprising capacitors 15 and 20, breakdown device 16, and resistor 18. Inductors can also be installed at both the source and load sides of the filter for effective attenuation in either direction. Similar attenuation in either direction can also be accomplished by connecting active filters as described above in parallel with both the load and the potential source on both sides of inductor 14.

While there have been shown and described particular embodiments of the invention, it will be apparent that various modifications and improvements can be made therein without departing from the spirit and scope of the invention as defined in the appended claims.

What is claimed is:

1. A circuit for suppressing transient voltage pulses comprising:
    a source of varying electrical potential;
    an electrical load connected across said source;
    inductor means connected in series with said load and said source;
    breakdown means having a predetermined threshold conduction level and a first capacitor connected in series therewith across said source in parallel with said load; and
    a second capacitor connected in parallel with said breakdown means from one side of said source to said first capacitor.

2. Apparatus as described in claim 1 wherein said second capacitor has a capacity from five percent to twenty five percent of that of said first capacitor.

3. Apparatus as described in claim 1 further including a resistor connected in parallel with said breakdown means and said second capacitor between said one said of said source and said first capacitor.

4. Apparatus as described in claim 1 wherein said breakdown means includes semiconductor devices having predetermined threshold conduction values.

5. Apparatus as described in claim 4 wherein said semiconductor devices are poled to establish a threshold conduction level for both positive and negative polarities.

6. Apparatus as described in claim 4 wherein said semiconductor devices include parallel, oppositely-poled silicon rectifiers.

7. Apparatus as described in claim 4 wherein said semiconductor devices include series-connected, oppositely-poled Zener diodes.

8. Apparatus as described in claim 5 wherein the threshold conduction level for said devices is approximately the same differential value for either polarity.

* * * * *